(12) United States Patent
Penn

(10) Patent No.: US 6,886,720 B2
(45) Date of Patent: May 3, 2005

(54) METERING DEVICE

(76) Inventor: Laurence Richard Penn, 14 Main St., Middleton, Market Harborough, LE16 8YU (GB)

(*) Notice: Subject to any disclaimer, the term of this patent is extended or adjusted under 35 U.S.C. 154(b) by 47 days.

(21) Appl. No.: 10/642,496

(22) Filed: Aug. 18, 2003

(65) Prior Publication Data
US 2004/0256422 A1 Dec. 23, 2004

(30) Foreign Application Priority Data
Jun. 19, 2003 (GB) .............................................. 0314322

(51) Int. Cl.[7] .............................................. B67D 5/06
(52) U.S. Cl. ...................... 222/504; 222/250; 222/548; 417/392; 417/386; 417/505; 417/506
(58) Field of Search ................................. 222/334, 395, 222/424.5, 427, 431, 434, 548, 504, 63, 249–250, 365, 216, 217–219; 251/172, 174, 175, 180; 417/505–506, 392, 386, 401

(56) References Cited

U.S. PATENT DOCUMENTS

| 4,162,750 A | * | 7/1979 | Demers et al. ............. 222/250 |
| 4,915,264 A | * | 4/1990 | Curtis ........................ 222/250 |
| 5,509,575 A | | 4/1996 | Gillette |
| 5,829,633 A | * | 11/1998 | Emmerich et al. ............. 222/1 |
| 6,676,387 B1 | * | 1/2004 | Penn .......................... 417/403 |

FOREIGN PATENT DOCUMENTS

| CA | 1067462 | 12/1979 |
| EP | 194370 | 9/1986 |
| GB | 1270262 | 4/1972 |
| GB | 2377425 | 1/2003 |
| WO | WO 9010190 | 9/1990 |
| WO | WO 0075611 | 12/2000 |

* cited by examiner

Primary Examiner—Frederick Nicolas
(74) Attorney, Agent, or Firm—Harrison & Egbert

(57) ABSTRACT

A metering device that includes a housing defining a cylindrical chamber containing a reciprocating shuttle. The two opposed end parts of the chamber are interconnected by fluid flow ducts to a cylindrical valve bore. Contained with the valve is a rotary valve rod driven rotationally by a stepping motor. The valve rod has part cut away to form channels or recesses. In one rotational position of the valve rod a flow path is established from an inlet to one end of the chamber and a separate flow path is established from the other end of the chamber to an outlet. In an alternate orientation of the valve rod a flow path is formed from the inlet to the other end of the chamber and the first end of the chamber is connected to an outlet.

6 Claims, 2 Drawing Sheets

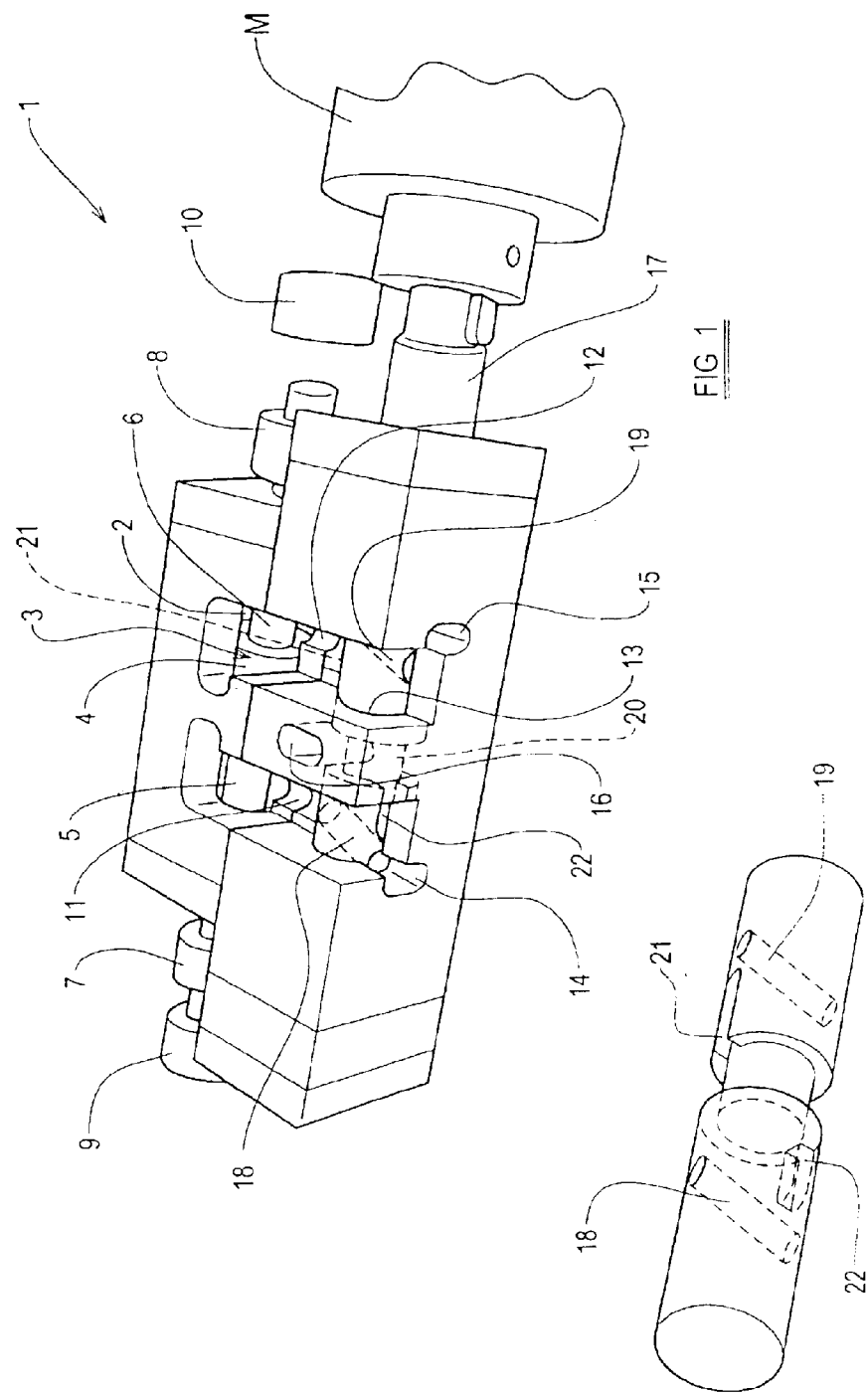

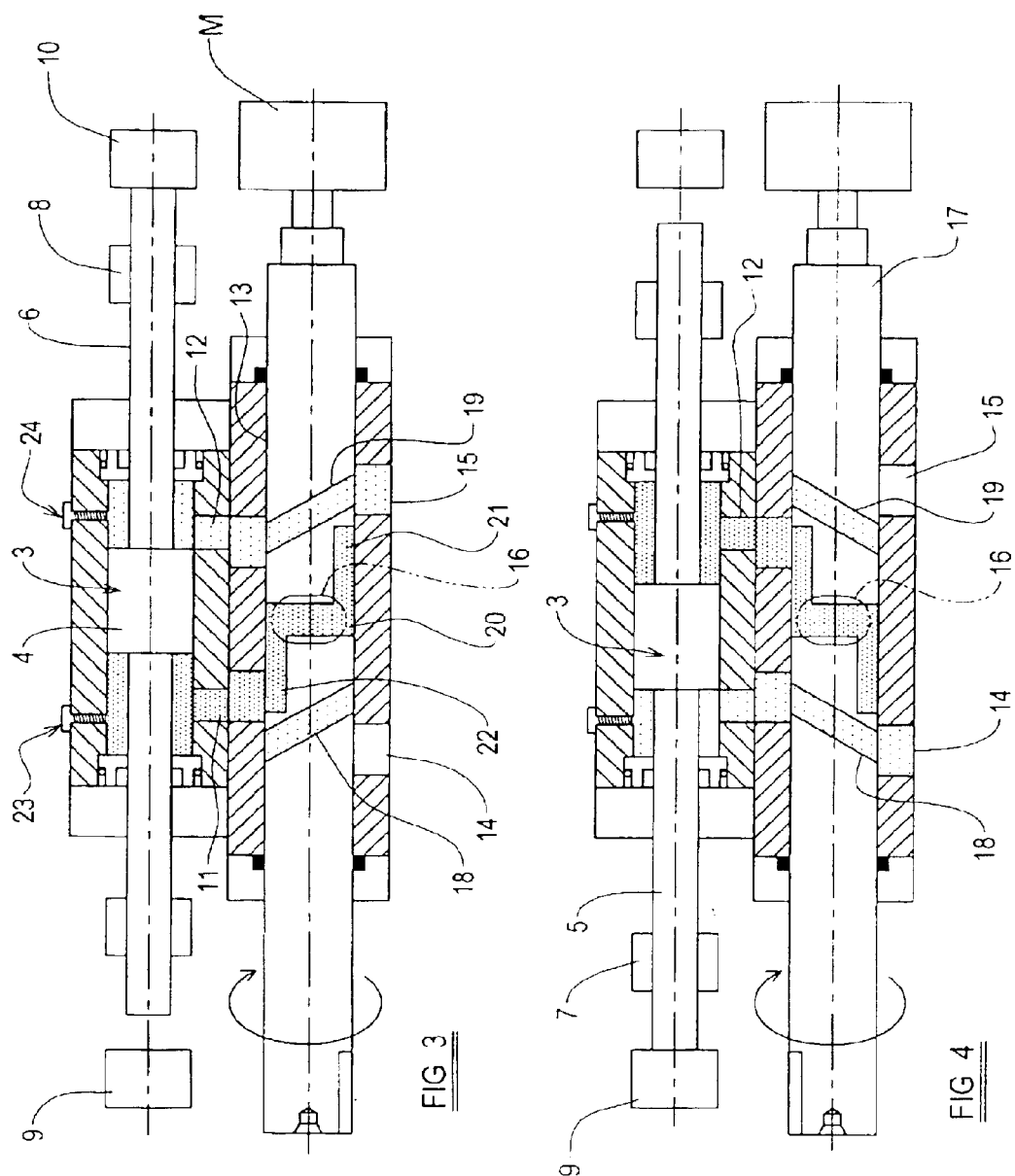

METERING DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a metering device and more particularly relates to a metering device of the type incorporating an elongate chamber having a shuttle contained within the chamber, the shuttle having a portion which is a substantially sealing sliding fit within the chamber, the shuttle being movable between an initial position and a second position with the chamber, each end of the chamber having a fluid flow duct through which pressurized fluid may enter and leave the chamber, there being a valve arrangement adapted to control the flow of pressurized fluid to and from the chamber such that, during successive cycles of operation of the metering device, fluid is supplied to one end of the chamber causing the shuttle to move from the initial position at the one end of the chamber to the second position at the other end of the chamber to eject a predetermined metered volume of fluid from the chamber and subsequently fluid is supplied to the other end of the chamber causing the shuttle to move back from the second position to the initial position again ejecting a predetermined metered volume of fluid from the chamber.

BACKGROUND OF THE INVENTION

Various metering devices of this type have been proposed before and reference may be made to a WO 90/10190A and WO00/75611A which disclose arrangements of this general type.

The GB-A-2377425 discloses a metering device of the type described above in which the valving arrangement comprises a spool valve having a spool sealingly slideable within a bore. A reciprocating mechanism is provided to drive the spool axially between two alternate positions in response to the shuttle reaching the initial position or the second position within the chamber. In one position the spool valve creates a fluid flow path for pressured liquid from a fluid flow inlet duct to one end of the chamber and also creates a fluid flow path from the other end of the chamber to a fluid flow outlet duct. In the second position of the spool a fluid flow path is created from a fluid flow inlet duct to the other end of the chamber and from the said one end of the chamber to the fluid flow outlet duct.

With a reciprocating movement the spool valve is subjected to many changes of momentum, which can cause wear in the drive mechanism.

OBJECT OF THE INVENTION

The present invention seeks to provide an improved metering device.

BRIEF SUMMARY OF THE INVENTION

According to this invention there is provided a metering device, the metering device incorporating an elongate chamber, there being a shuttle contained within the chamber, the shuttle having a portion which is a substantially sealing sliding fit within the chamber, the shuttle being moveable axially between an initial position and a second position within the chamber, each end of the chamber being provided with a fluid flow duct through which pressured fluid may enter and leave the chamber, there being valve arrangement to control the flow of fluid to and from the chamber such that, during successive cycles of operation of the metering device, fluid is supplied to one end of the chamber causing the shuttle to move from the initial position at said one end of the chamber to the second position at the other end of the chamber, thus ejecting a pre-determined volume of fluid from the other end of the chamber, and subsequently fluid is supplied to said other end of the chamber causing the shuttle to move back from the second position to the initial position, ejecting a pre-determined quantity of fluid from the said one end of the chamber, the valving means comprising a rotary valve rod contained within a valve bore, and a mechanism to rotate the valve rod, the fluid flow ducts from the chamber extending to the valve bore, at least one fluid inlet extending to the valve bore and at least one fluid outlet extending from the valve bore, the valve rod, in combination with the valve bore, defining fluid flow passages which, in one orientation of the valve rod serve to interconnect a fluid flow inlet and the fluid flow duct extending to one end of the chamber whilst interconnecting the fluid flow duct extending to the other end of the chamber with an outlet and, in an alternate orientation, serving to interconnect the fluid flow inlet with the fluid flow duct extending to the other end of the bore whilst connecting the fluid flow duct extending to the said one end of the bore with an outlet.

Preferably the valve rod is rotated by a motor arrangement, the motor arrangement being controlled in response to a signal generated in response to the shuttle reaching the initial position or the second position.

Conveniently the motor arrangement is a stepping motor.

Advantageously the shuttle is provided with two rods, each rod extending beyond the chamber, there being a contact or proximity sensor located adjacent the end of each rod, to generate a signal when the shuttle reaches the initial position and the second position.

Preferably adjustable collars are provided on the shuttle rods to limit the movement of the shuttle.

Conveniently at least one air bleed is provided communicating with part of said chamber to bleed air from the chamber.

BRIEF DESCRIPTION OF THE SEVERAL VIEWS OF THE DRAWINGS

FIG. 1 is a partially exploded perspective view of a metering device in accordance with the invention;

FIG. 2 is an isolated exploded perspective view of the rotary valve rod;

FIG. 3 is a diagrammatic sectional view illustrating one phase of operation of the device;

FIG. 4 is another diagrammatic sectional view corresponding to FIG. 3 illustrating another in the operation of the device.

DETAILED DESCRIPTION OF THE INVENTION

In order that the invention maybe more readily understood and so that further features thereof may be appreciated, the invention will now be described, by way of example, with reference to the accompanying drawings.

Referring initially to FIG. 1 of the accompanying drawings a metering device in accordance with the invention comprises a housing 1 which defines a cylindrical chamber 2. Contained within the chamber 2 is a shuttle 3. The shuttle 3 is a unit or assembly which has a cylindrical central cylindrical portion 4 which is a sliding sealing fit with the chamber 2. The shuttle incorporates two rods 5,6 which extend axially from opposite sides of the cylindrical portion 4 and which pass, as a sliding sealing fit through apertures formed in the end walls of the chamber 2, the rods 5,6 thus projecting beyond the housing. Mounted on the projecting portions of the rods 5,6 are adjustable collars 7,8, the position of which may be adjusted to alter the "stroke" of the metering device as will become clear from the following description. Located adjacent the ends of the rods 5,6 are sensors 9,10 which are responsive to the rods 5,6 each reaching a pre-determined position. The sensors may, ideally, be responsive to physical contact of the end of the rod with the sensor.

The central cylindrical portion 4 of the shuttle effectively divides the chamber 2 into two separate parts, one at the left-hand end of the chamber and the other at the right-hand end of the chamber. Respective fluid flow ducts 11, 12 connect these end parts of the chamber 2 to spaced-apart points of a cylindrical valve bore 13 defined within the housing 1. Outlet and inlet ducting also communicate with the bore 13. Thus the housing defines a first outlet duct 14 offset from the duct 11 and second outlet duct 15 offset from the duct 12. The ducts 14 and 15 are off-set axially from the ducts 111 and 12, being closer to the ends of the valve bore 13, but one diametrically opposed to the ducts 11, 12. A fluid inlet duct 16 is also defined located at a position between the two fluid flow ducts 11,12. Contained within the valve bore 13 is a rotary valve rod 17 which is driven rotationally by a stepping motor M in response to signals from the sensors 9, 10.

The valve rod 17 has parts thereof cut away in the form of a channel or recess in the periphery of the rod and passages or bores through the rod so that the valve rod 17, when in the bore 13, may define fluid flow paths. The valve rod 17 is provided with a first through bore 18 which is inclined to the axis of the valve rod 17 and which, in one rotational position of the valve rod 17, when the valve rod 17 is present in the bore, serves to interconnect the fluid flow duct 11 and the outlet duct 14. A second corresponding bore 19 is provided, which is actually parallel with the first bore 18, which, as will be understood from FIG. 2, in an alternate rotational position of the valve rod 17 serves to interconnect the fluid flow duct 12 and the outlet 15. Between the two bores 18, 19, there is an annular groove 20 formed in the exterior surface of the valve rod 17 which is in alignment with the inlet 16. The groove 20 is provided with two diametrically opposed axial extensions 21,22, which extend in opposite axial directions. It is to be appreciated that in one rotational position of the valve rod 17 the axial extension 21 will extend to the end of the flow passage 12 thus forming a flow path from the inlet 16 to the right-hand end of the chamber 2, and in an alternate position of the valve rod 17 groove 22 will establish communication with the flow path 11.

Looking now at FIG. 3 the shuttle 3 is shown, in a right-hand most position with the end of the projecting shuttle rod 6 engaging the sensor 10. As the shuttle rod 6 contacts the sensor 10, so the stepping motor M rotates the valve rod 17 by 180°, thus moving the valve rod 17 to the position as shown in FIG. 4. When the valve rod 17 is in the position or orientation as shown in FIG. 4 the groove 20 and the axial extension 21 serve to connect the inlet 16 to the fluid flow passage 12 which communicates with the right-hand end of the chamber 2, whereas the bore 18 serves to interconnect the fluid flow duct 11 (which, in turn, communicates with the left-hand end of the chamber 2), and the outlet 14. Pressured fluid may thus flow from the inlet 16 through the annular groove 20 and the axial extension 21, through the fluid flow duct 12 into the right-hand end of the chamber 2 thus serving to move the shuttle 3 towards the left. As the shuttle 3 moves towards the left, so fluid in the right-hand end of the chamber is discharged through the fluid flow duct 11, and the bore 18 and through the outlet 14. The shuttle 3 thus continues to move towards the left until the shuttle rod 5 contacts sensor 9. When the sensor 9 is contacted, the shuttle 3 has completed its stroke and a pre-determined quantity of fluid in the form of a metered "shot" of fluid has been ejected through the outlet 14.

In response to a signal generated by the sensor 9 when touched by the shuttle rod 5, the stepping motor M again rotates the valve rod 17 by 180°, thus returning the valve rod 17 to the position or orientation shown in FIG. 3. With the valve rod 17 in the position shown in FIG. 3 fluid will flow from the inlet through the annular groove 20, the axial extension 22, and through the fluid flow duct 11 to the left-hand end of the chamber 2. The bore 19 in the valve rod 17 interconnects the fluid flow duct 12 and the outlet 15, allowing fluid from the right-hand end of the chamber to flow to the outlet 15. Thus the shuttle 3 will move towards the right until the shuttle rod 6 establishes a contact with the sensor 10. As the shuttle makes the movement to the right a pre-determined quantity of fluid, in the form of a metered "shot" of fluid, is ejected from the right-hand part of the chamber 2 through the outlet 15. When the shuttle rod 6 contacts the sensor 10 the motor M is actuated again. The cycle of operation may then repeat.

Since the stepping motor M only rotates the valve rod 17 on receipt of a signal from the sensor 9 or the sensor 10, should the shuttle not be able to complete its stroke, for example due to a lack of fluid, or insufficient fluid pressure, no signal will be given and the metering unit will just stop. In this way it can be ensured that for each cycle of operation the metering unit delivers an appropriate quantity of fluid, in the form of a correctly metered "shot"; which can be of crucial importance if two fluids, which are components of, for example, a two-part adhesive or the like, are to be metered by two separate metering units and mixed in a precisely pre-determined ratio.

It is to be appreciated that the position of the collars 7,8 on rods 5,6 may be adjusted and the position of the sensors 9,10 may be adjusted to increase or decrease the stroke of the shuttle, thus increasing or decreasing the quantity of fluid ejected on each stroke of the shuttle.

As shown in FIGS. 3 and 4 the chamber 2 may be provided on either side of the cylindrical portion 4 of the shuttle 3, with air bleeds 23, 24. These may be opened to permit air to escape from the chamber 2, especially when the described metering device is first filled with the fluid to be metered, to ensure that all of the air is vented away, so that hydraulic integrity can be established with no compressible air remaining in the chamber 2.

In the described embodiment the valve is a rotary valve rod, which facilitates manufacture and maintenance of the valve. In use, the valve rod may rotate almost uniformly, avoiding sudden changes of momentum as maybe experienced with a reciprocating valve.

Of course, the metering device as described may be "reversed", with pressurized fluid being supplied to the "outlets" 14,15, and with the "inlet" 16 actually acting as an outlet.

Whilst the invention has been described with reference to contact sensors 9,10 responsive to contact with the shuttle rods, proximity sensors which respond when the shuttle rods reach pre-determined positions may be used.

In the present Specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

I claim:

1. A metering device, comprising:

an elongate chamber, the chamber having a shuttle contained within the chamber, the shuttle having a portion which is a substantially sealing sliding fit within the chamber, the shuttle being moveable axially between an initial position and a second position within the chamber, each end of the chamber being comprised of a fluid flow duct through which pressured fluid may enter and leave the chamber, and a valve arrangement means to control flow of fluid to and from the chamber such that, during successive cycles of operation, fluid is supplied to one end of the chamber causing the shuttle to move from the initial position at said one end of the chamber to the second position at the other end of the chamber, thus ejecting a pre-determined volume of fluid from the other end of the chamber, and subsequently fluid is supplied to said other end of the chamber causing the shuttle to move back from the second position to the initial position, ejecting a pre-determined quantity of fluid from the said one end of the chamber, wherein the valve arrangement means comprises a rotary valve rod contained within a valve bare, and a mechanism to rotate the valve rod, the fluid flow ducts from the chamber extending to the valve bore, at least one fluid inlet extending to the valve bore and at least one fluid outlet extending from the valve bore, the valve rod, in combination with the valve bore, defining fluid flow passages which, in one orientation of the valve rod, serve to interconnect a fluid flow inlet, and the fluid flow duct extending to one end of the chamber, while interconnecting the fluid flow duct extending to the other end of the chamber, with a first outlet and, in an alternate orientation, serving to interconnect the fluid flow inlet with the fluid flow duct extending to the other end of the chamber, while connecting the fluid flow duct extending to the one end of the chamber, with a second outlet.

2. A metering device according to claim 1, wherein the valve rod is rotated by a motor arrangement, the motor arrangement being controlled in response to a signal generated in response to the shuttle reaching the initial position or the second position.

3. A metering device according to claim 2, wherein the motor arrangement is comprised of a stepping motor.

4. A metering device according to claim 2, wherein the shuttle comprises two rods, each rod extending beyond the chamber, there being a contact or proximity sensor located adjacent the end of each rod, to generate a signal when the shuttle reaches the initial position and the second position.

5. A metering device according to claim 4, wherein the shuttle is further comprised of adjustable collars on the two rods to limit movement of the shuttle.

6. A metering device according to any one of claim 1, further comprising at least one air bleed communicating with part of the chamber to bleed air from the chamber.

* * * * *